United States Patent [19]
Perregaux et al.

[11] 4,355,868
[45] Oct. 26, 1982

[54] TRANSFLECTOR DESIGNED AS A FOIL FOR USE WITH LIQUID CRYSTAL DISPLAYS

[75] Inventors: Alain Perregaux, Wettingen; Toni Bunschi, Flüelen, both of Switzerland

[73] Assignee: BBC Brown, Boveri & Company, Limited, Baden, Switzerland

[21] Appl. No.: 145,819

[22] Filed: May 1, 1980

[30] Foreign Application Priority Data

May 31, 1979 [CH] Switzerland ............... 5071/79

[51] Int. Cl.³ .............................. G02F 1/133
[52] U.S. Cl. ...................... 350/338; 350/345
[58] Field of Search ........... 350/334, 338, 345, 431, 350/321, 3.81, 105

[56] References Cited
U.S. PATENT DOCUMENTS 2,443,918  6/1948  Lahousse et al. ................ 350/431
3,984,176  10/1976  Hirai et al. ...................... 350/345

OTHER PUBLICATIONS

*IBM Technical Disclosure Bulletin,* vol. 10, No. 8, Jan. 1968, p. 1120, Jacobus et al., "Visible Light-Emitting Diode".

*Primary Examiner*—John K. Corbin
*Assistant Examiner*—Daniel Julian Hubbard
*Attorney, Agent, or Firm*—Oblon, Fisher, Spivak, McClelland & Maier

[57] ABSTRACT

The disclosed transflector consists of a transparent foil which is given an additive of a first filling material for adjusting the transmission and the reflection of light. In the preferred embodiment, a second filling material is added to the foil for establishing the scattering of the transmitted and the reflected light and a third filling material is added for producing a coarse surface which encourages eye accommodation by the observer.

15 Claims, 3 Drawing Figures

TRANSFLECTOR DESIGNED AS A FOIL FOR USE WITH LIQUID CRYSTAL DISPLAYS

BACKGROUND OF THE INVENTION

1. Field of the Invention

The present invention relates to a transflector designed as a foil and is particularly adapted for usage with liquid crystal displays.

2. Description of the Prior Art

Liquid crystal displays are passive display elements which produce no light themselves but rather change the intensity of the permeating light. Therefore, such display mechanisms can only be read in the presence of permeating light which is produced by a sufficiently ambient light source or another light source.

In most practical uses of liquid crystal displays, only the surface facing the observer, which will subsequently be called simply the front side, is subject to the ambient light. Therefore, for producing permeating light from ambient light sources it is necessary to reflect the back side of the display mechanism or to place a reflector near the back side. With lighting provided by another light source, this light source or a suitable lighting mechanism is simply located near the back side of the display mechanism for producing the permeating light.

Liquid crystal displays are mainly used for battery-operated measuring equipment and especially for watches. In order not to strain the battery unnecessarily with the current required by the light source and, despite this, still be able to read the display, if there is no ambient light source, liquid crystal displays are commonly designed with another light source for reading even if there is enough ambient light. The additional light source is only switched on in case of need and for short periods of time. For this reason, two different designs are used in this invention (i.e., the light circuit and the transflector designs).

In the light circuit design, a disc-shaped lighting circuit is located on the back side of the display mechanism, the rear surface of which is reflective and along the lateral surfaces of which is located a light source. This design allows for reflection of the permeating light by means of the reflecting rear surfaces in the presence of ambient light of the display mechanism and enables the usage of the light beamed in laterally to the light circuit and exiting at its entire front surface for permeating light throughout the display mechanism when the light source is turned on.

The light circuit design enables clear readings from the liquid crystal display both with ambient light as well as with another light source. The disadvantage in this design is the relatively large distance between the active layer of the display mechanism and the rear reflecting layer on the light circuit. This distance causes a possible shadow effect along with the original display when the light falls at an angle. Furthermore, optical errors become clearly visible at the rear of the display mechanism, on the front surfaces or on the reflected surfaces of the light circuit just as dust particles are between the light circuit and the display mechanism with influence the aesthetics of the display mechanism negatively. The aforementioned, physically founded disadvantage cannot be practically corrected. In order to prevent these disadvantages, the light circuit and the display element have to be checked very exactly for any possible optical faults before being assembled and this assembly would have to be performed in a dust-free surrounding and with a great degree of care which would markedly increase the cost for the light circuit design.

In the transflector design, the light source is located adjacent the rear side of the display mechanism and a transflector is located between the light source and the rear side having the effect of a semipermeating reflector. The transflector reflects ambient light appearing on the front side of the display mechanism and permeates the light produced for it by the light source. Advantageously, a transflector is used which reflects diffused light and beams off the permeated light diffusely and the ratio of permeated light to reflected light is about 50 percent.

With the transflector design, the above-mentioned disadvantages of the light circuit design can be practically avoided. If the reflection and the transmission of the light are diffused, then the exiting light shows no or only a weak preferred direction and optical faults on the rear side of the display mechanism or in the light circuit or of the light source are not visible. The diffuse transmission also enables the positioning of a large-surfaced light source, for example a luminescence plate or numerous small glass tubes, that are phosphorescent and are excited by tritium, directly behind the transflector without negatively affecting the even scattering of light beyond the already described light circuit with a laterally positioned light source.

Commercially available materials can be used for the transflector, for example foils made of foamed synthetic materials and in particular foils made of foamed polystyrene or polypropylene which are produced on a mass scale for the packaging industry.

As has been shown in practice, the optical properties of these commercially available materials are not constant. This particularly concerns the ratio of reflection to transmission, the scattering of the reflected and of the light source-produced light in the transflector as well as the effective surface coarseness which appears as a light "basic surface" of the liquid crystal display. Up to now, there has been no success in optimizing these properties by changing the pore or cell structure of the foamed synthetic foils.

SUMMARY OF THE INVENTION

The present discovery therefore has the task of creating a transflector, the optical properties of which can be established in advance and independently of each other and which can be produced by an industrially feasible procedure with constant degrees of quality and at an acceptable price.

In accordance with the discovery, this task is solved with a transflector designed as a foil which is characterized by an optically transparent matrix material and at least a first, similarly transparent, filling material, the optical refraction index of which is larger than the optical refraction index of the matrix material.

The new transflector enables the very exact setting of the ratio of transmission to reflection by the suitable selection of the type and the amount of the first filling material.

In a first preferred embodiment, the new transflector also contains a second transparent, powdery filling material, the refraction index of which is larger than the refraction index of the matrix material and of which is smaller than the refraction index of the first filling material. An advantageous scattering of the light produced by a light source and reflecting from the first filling material can thereby be achieved which enables the even exiting of the permeated and the rflecting light in practically all directions.

In a second preferred embodiment, the new transflector also contains a third transparent filling material which causes a rough surface. In this manner, a border surface visible to the observer can be produced for the bright picture portions of the liquid crystal display.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
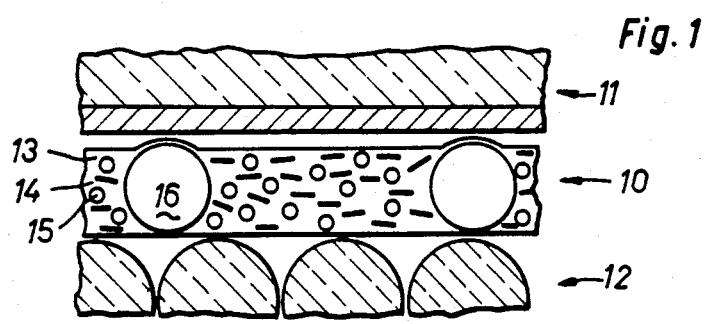
FIG. 1 is a schematically drawn illustration, in section, of a first embodiment of the transflector of this invention.

In FIG. 1, the cross-section of a first embodiment of a transflector (10) is indicated schematically. The transflector is attached to the back side of a liquid crystal display (11) and a lighting mechanism (12) is positioned on its rear side. The lighting mechanism (12) consists of numerous small glass tubes (12) that are phosphorescent and excited by tritium. The transflector contains a matrix (13) in which very small discs (14) of a first filling material as well as powdered granules (15) of a second filling material and somewhat larger particles (16) of a third filling material are implanted. The thickness of the transflector is between 20 to 200 μm, preferably between 70 to 100 μm.

The first filling material consists of small mica discs (14), both surfaces of which are coated with a thin layer of titanium dioxide. This material is transparent and reflecting due to the high refraction index of the titanium dioxide. The material is commercially available and can, for example, be obtained from the Merck firm in Germany under the name of "Iriodin". About 2 percent by weight of such coated mica discs, with a mean surface size of about 20 μm, are added to the diluted matrix material to achieve the desired ratio of transmission to reflection of 50:50. It has been shown that after casting or extruding the foils, the majority of the discs are positioned approximately parallel to the surface levels of the foils.

As any expert can immediately recongnize, the ratio of transmission to reflection can be established by adding a larger or smaller amount of discs or by using discs with a larger or smaller mean surface size within its borders.

The second filling material is a fine powder made of glass or quartz. The amount of this powder is about 2 percent of the weight of the diluted matrix material and the mean diameter of the irregularly shaped particles (15) is about 5 μm. The particles cause a massive scatering of the light reflected by the discs (14), of the first filling material, as well as the light produced by the neighboring light source (12) and the light permeating the transflector. In this manner, the preferred direction of the light reflected by the discs (14) or permeating the transflector is effectively prevented so that the transflector provides even brightness in a wide area of the direction of observation.

The third filling material is also a powdery material and, for example, is made of glass or quartz. The amount of this material is about 2 percent per weight of the diluted matrix material and the mean diameter of the irregularly shaped particles (16) is close to the thickness of the transflector. With the third filling material, the transflector forms a relatively coarse surface that can be recognized by the observer and the eye of the observer accommodates itself to the correct distance for reading the display.

Figure 2:
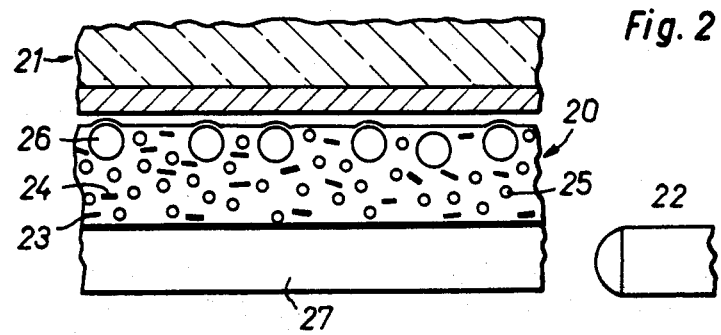
FIG. 2 is a schematically drawn illustration, in section, of a second embodiment of the transflector of this invention.

FIG. 2 shows schematically the cross-section of a second embodiment of a transflector (20) which is positioned on the back side of a liquid crystal display (21). On the other side of transflector (20) are positioned a light-emitting diode (22), used as a lighting mechanism, and a neighboring light circuit (27). The matrix material (23) of this transflector is polystyrene to which titanium dioxide coated mica discs (24) are added as a first filling substance. The transflector contains another filling material, the density of which is smaller than the density of the matrix material. For example, this filling material is polyethylene and the distribution curve of the particle sizes is very wide. Upon casting the transflector foils, the particles of the filling material, distributed at first evenly in the matrix mass, become separated due to the effects of buoyancy and friction, which are proportional to the volume and the surfaces of the matrix mass, so that the larger particles (26) are enriched in the area of the surface of the transflector and the formation of an uneven surface is favored, whereas, the smaller particles (25) are distributed practically evenly across the entire thickness of the transflector foil.

Figure 3:
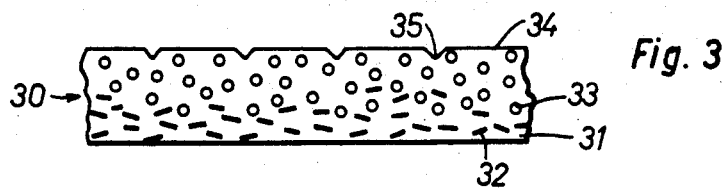
FIG. 3 is a schematically drawn illustration, in section, of a third embodiment of the transflector of this invention.

FIG. 3 shows schematically the cross-section of a third embodiment of a transflector (30). The matrix (31) of this transflector consists of polypropylene. The first filling material again consists of mica discs (32) coated with titanium dioxide and the second filling material is made of glass powder, the irregularly shaped particles (33) of which have a mean diameter of about 5 μm. Upon casting this tranflector foil, the matrix material was dried very slowly so that the discs (32) of the first filling material could sink down and form a relatively compact layer. A crisscrossed shaped pattern is pressed onto the surface (34), designed for attachment to the rear side of the liquid crystal display, with a correspondingly shaped roller—in the diagram, only the lattice lines positioned perpendicular to the level of the diagram can be seen. The distance between the neighboring lattice lines (35) is about 0.1 mm which is sufficient to cause the desired surface coarseness.

In principle, all solvent-soluble and castable synthetic materials, but also extrusion thermoplastics, can be used for producing the new transflector foils whereby the filling materials are added into the solution or to the casting material or to the granules. The best results are achieved, up to now, with solvent-soluble synthetic materials for which the above-mentioned percentages of weight to the synthetic material plus the solvent were provided. Experience has shown that a good ratio of synthetic materials to the solvent is about 6:1. The synthetics used should be sufficiently elastic so that the transflector foils can be wound onto a supply roll, the core of which has a diameter of about 10 cm. Because the liquid crystal displays are supposed to withstand temperatures of up to about 100° C., the synthetic material of the transflector should also be able to withstand this temperature.

Any type of pearl lustre pigment can be used for the first filling material if it simultaneously reflects and allows light to permeate it. If another material is used instead of the described titanium dioxide coated mica, which also reflects diffusely, then, in this case, the second filling material is no longer needed.

In a tested production procedure, the viscosity of the diluted matrix material upon casting and at a temperature of 20° C. is around 65,000 cps. The mass is cast on a roll about 30 cm wide which unwinds at a speed of above 200 m/h. The layer is dried at a temperature of about 50° C. for about 10 minutes, whereupon, the thickness of the finished transflector foil is about 70 $\mu$m.

If a dyed transflector is to be manufactured, then the casting mass can be given additives of both dyes as well as of a finely distributed pigment. Mica discs already exist which are coated with dyed titanium dioxide.

ELEMENTS IN FIGS. 1–3

10 = transflector
11 = liquid crystal display
12 = lighting mechanism
13 = matrix
14 = first filling material
15 = second filling material
16 = third filling material
20 = transflector
21 = liquid crystal display
22 = light-emitting diode
23 = matrix material
24 = first filling material
25 = second filling material
26 = third filling material
27 = light circuit
30 = transflector
31 = matrix
32 = first filling material
33 = second filling material
34 = surface
35 = lattice lines.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transflector designed as a foil provided with an optically transparent matrix material and at least a similarly transparent filling material, the refraction index of which is larger than that of the matrix material, said filling material comprising mica discs coated with titanium dioxide with a mean surface size between 5 and 50 $\mu$m.

2. A transflector according to claim 1 wherein the matrix material is selected from the group containing polyethylene, polypropylene and cellulose triacetate.

3. A transflector according to claim 1 wherein mica discs coated with titanium dioxide with a mean surface size of around 20 $\mu$m are used as the filling material.

4. A transflector according to claim 1 wherein the portion of the first filling material is 1 to 3 percent per weight of the diluted matrix material.

5. A transflector according to claim 1 further including a second transparent powdery filling material which is suitable for scattering light and the refraction index of which is larger than that of the matrix material and smaller than that of the first filling material.

6. A transflector according to claim 5 wherein the second filling material consists of glass powder with a particle size of less than 10 $\mu$m.

7. A transflector according to claim 6 wherein the second filling material consists of glass powder with a particle size of less than 5 $\mu$m.

8. A transflector according to claim 5 wherein the portion of the second filling material is 1 to 3 percent per weight of the diluted matrix material.

9. A transflector according to claim 5 further including a third transparent filling material for providing a rough surface on the transflector.

10. A transflector according to claim 9 wherein the third filling material consists of glass powder and the particles sizes thereof correspond substantially to the thickness of the foil.

11. A transflector according to claim 9 wherein the third filling material consists of synthetic powder, the density of which is smaller than the density of the diluted matrix material and the particle sizes of which are smaller than 50 $\mu$m.

12. A transflector according to claim 9 wherein the portion of the third filling substance is 1 to 2 percent of the weight of the diluted matrix material.

13. A transflector according to claim 9 wherein the rough surface on the transflector is designed for attachment to the back side of a liquid crystal display.

14. A transflector according to claim 13 further including another powdery filling material with a wide distribution of the mean particle sizes whereby the larger particles are enriched at the surface designed for attachment to the liquid crystal display and thereby become coarse whereas the smaller particles are distributed practically evenly in the foil.

15. A transflector designed as a foil provided with an optically transparent matrix material and at least a similarly transparent filling material, the refraction index of which is larger than that of the matrix material, said filling material comprising mica discs coated with titanium dioxide.

* * * * *